Oct. 19, 1948.     C. H. MYERS ET AL     2,451,688
HYDRAULIC CLUTCH AND VARIABLE SPEED DRIVE

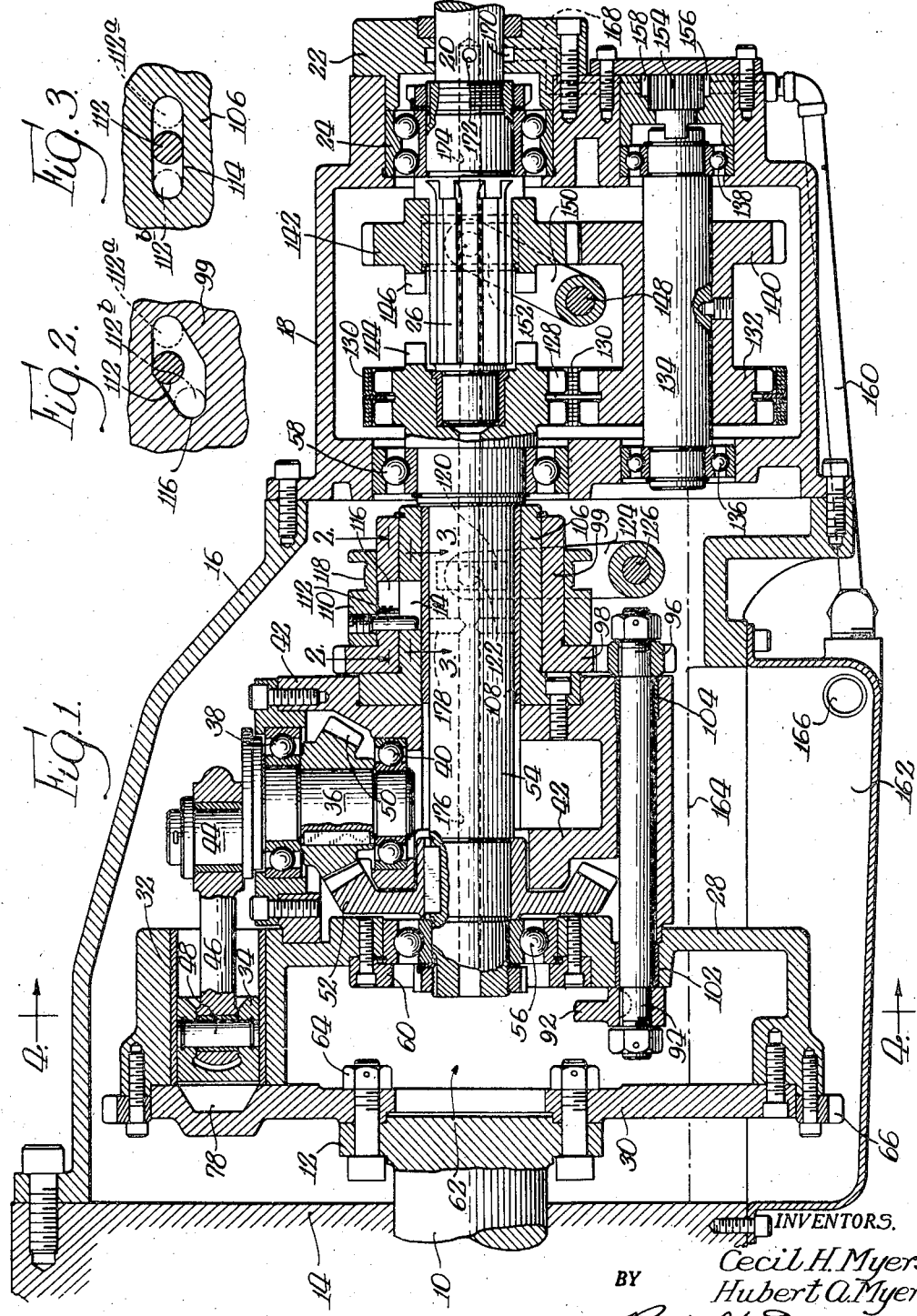

Filed Jan. 13, 1944     2 Sheets-Sheet 2

INVENTORS.
Cecil H. Myers,
BY Hubert A. Myers
Bair & Freeman
Attys

Patented Oct. 19, 1948

2,451,688

UNITED STATES PATENT OFFICE 2,451,688

HYDRAULIC CLUTCH AND VARIABLE-SPEED DRIVE

Cecil Harvey Myers and Hubert A. Myers, Chicago, Ill.

Application January 13, 1944, Serial No. 518,074

17 Claims. (Cl. 74—294)

Our present invention relates to a hydraulic clutch and variable speed drive having automatic variation of the speed with selective control for partial or non-automatic operation if desired.

One object of the invention is to provide a hydraulic clutch and variable speed drive in which various elements thereof such as cylinders, pistons, valves, connecting rods, crank shafts and the like are rotatable as a unit with a power shaft so as to form in effect a fly wheel therefor, thus utilizing the weight required for the usual fly wheel necessary on internal combustion and Diesel engines for the parts of the hydraulic drive.

Another object is to provide a device of this general character having control valves which are of balanced type so that they are movable under the effect of centrifugal force, the valves being so arranged and of such weight that the desired control characteristic is secured depending upon merely speeding up the power shaft, and the parts being so related that at a given speed the effect of a direct drive is secured, whereas between a stand-still position and the direct drive speed, the effective gear ratio gradually increases during the speed pick-up period.

Another object is to provide a hydraulic clutch and variable speed drive which is particularly adapted for use in automobiles and the like taking up about the same space as the usual fly wheel and transmission housing although of course it may be adapted for many different uses and in connection with electric and many other types of motors.

Still another object is to provide a selective control which may be adjusted for entirely counteracting centrifugal force acting on the control valves or partially so for either providing a declutched operating characteristic or in effect a lower than direct speed when the engine is speeded up, thereby making greater power available for emergencies.

A further object is to provide the selective control adjustable to a position for positively locking the drive in "high."

Still a further object is to provide a hydraulic drive having reversing means associated therewith, and a pumping means for keeping the oil chamber communicating with the pistons and valves under pressure to eliminate air pockets.

With these and other objects in view, our invention consists in the construction, arrangement and combination of the various parts of our device whereby the objects contemplated are attained, as hereinafter more fully set forth, pointed out in our claims and illustrated in the accompanying drawings, wherein:

Figure 1 is a vertical sectional view through a hydraulic clutch and variable speed drive embodying our invention.

Figures 2 and 3 are sectional views on the lines 2—2 and 3—3 on Figure 1, showing constructional features of a selective control mechanism.

Figure 4:
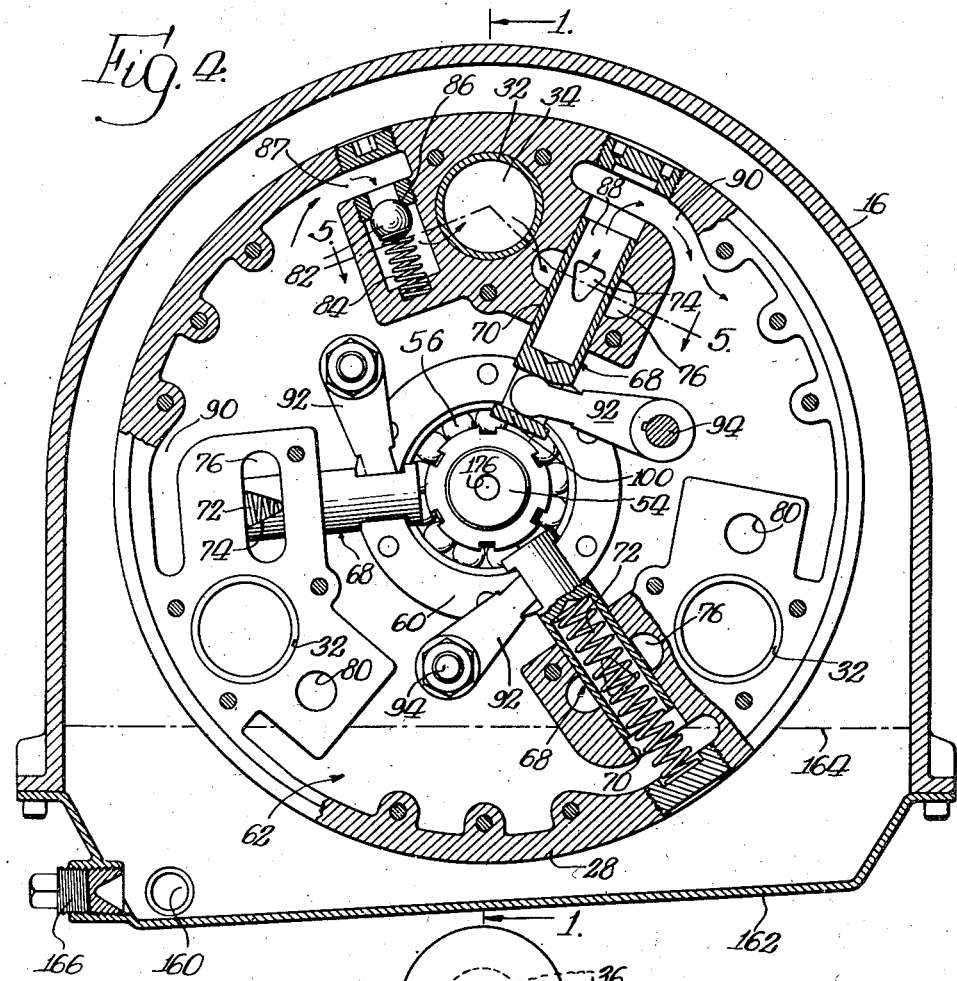
Figure 4 is a vertical sectional view on the line 4—4 of Figure 1, showing particularly the automatic control valve arrangement.

On the accompanying drawings we have used the reference numeral 10 to indicate a power shaft such as the crank shaft of an automobile engine. An attaching flange 12 is usually provided on the crank shaft. The crank case of the engine is shown at 14 and the flange 12 ordinarily has a fly wheel attached thereto.

A pair of housings 16 and 18 are shown, the propeller shaft 20 of the automobile being illustrated as extending into a packing gland 22 of the housing 18. The propeller shaft 20 is journaled in a ball bearing assembly 24, and has a splined portion 26 at its left end. The right hand end extends on through the usual universal joint to the differential of the automobile.

Within the housing 16 is a fly wheel assembly comprising an oil chamber housing 28, an end plate 30 therefor, a plurality of cylinders 32 in the housing 28, a piston 34 in each cylinder, and a crank shaft 36 for each piston. The cylinders 32 are illustrated as three in number and they are distributed around the axis of rotation of the power shaft 10. Any desired number of cylinders may be provided.

The crank shafts 36 have their axes extending radially from the axis of the shaft 10 and are journaled in bearings 38 and 40. The bearings 38 and 40 are mounted in a gear housing 42 secured to the oil chamber housing 28. Each crank shaft has a crank pin 44 which is operatively connected with its respective piston 34 by a connecting rod 46 and a wrist pin 48.

Keyed on each crank shaft 36 is a crank shaft gear 50. The gears 50 mesh with a single gear 52 keyed to a driven shaft 54. The gears 50 and 52 as will be noted are of the beveled type. The driven shaft 54 has its left end journaled in a bearing 56 mounted in the housing 18 and retained in position by a retainer ring 60. An oil chamber designated at 62, is formed within the housing 28 and its cover plate 30.

The cover plate 30 it will be noted is secured to the flange 12 by bolts whereby the entire assembly of elements 28 to 50 rotates as a unit and its mass serves as a fly wheel. It is thereby unnecessary to have a fly wheel in addition to the parts just named to give the desired fly wheel effect for proper operation of the engine. A ring gear 66 may also be secured to the housing 28 for coaction with a Bendix starter in the usual manner, and the ring gear also forms part of the fly wheel.

Within the oil chamber 62 we provide a valve 68 for each piston and cylinder combination. Each valve 68 is tubular in form and radially slidable in a bore 70 (see Figure 4). Each valve is normally held at its inner limit of sliding movement by a spring 72 and is adapted to move outwardly in response to centrifugal force.

Figure 5:
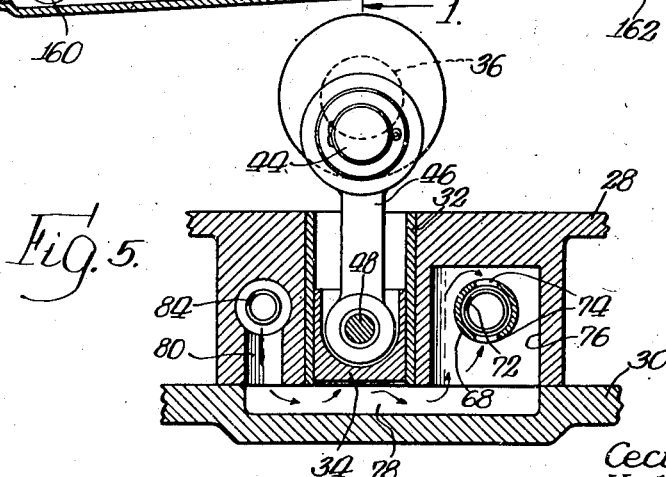
Figure 5 is a sectional view on the line 5—5 of Figure 4 showing the association of certain passageways with an intake valve and with ports of the valve.

Each valve 68 is provided with a pair of opposite triangular shaped ports 74 to variably coact with a cavity 76 surrounding the sleeve-like valve and communicating as shown in Figure 5 with its cylinder 32 by means of a passageway 78 formed in the cover plate 30. The cavity 76 extends all the way around the valve as shown so that the valve is balanced and oil pressure therefore does not interfere with its free movement under the action of centrifugal force. The passageway 78 also communicates with an intake valve cavity 80 located inwardly of a ball-type intake check valve 82. The valve 82 is normally seated by a spring 84 against a valve seat 86. The valve seat 86 communicates directly by means of a passageway 87 with the oil chamber 62 as does also the interior of the valve 68. Such interior is indicated at 88 in Figure 4, and it will be noted that it opens directly into a passageway 90 leading to the oil chamber 62.

The valves 68 are synchronized with each other by means of rock-arms 92, rock-shafts 94, pinions 96 and a gear 98. The rock arms 92 are confined to lateral sliding movement in slots 100 of the valves 68 and are secured to the rock shafts by keys or the like. The pinions 96 are likewise keyed to the rock-shafts and the rock-shafts are journaled, as in bearings 102 and 104 in the housing 28 and the housing 42 as shown in Figure 1. The gear 98 is rotatably mounted on a sleeve 106 secured to the housing 42 and bushed at 108 for the driven shaft 54.

We provide a selective control in the form of a sleeve 110 slidable on a sleeve-like extension 99 of the gear 98. The sleeve 110 is prevented from rotating by a pin 112 carried thereby and entering a parallel sided slot 114 in the sleeve 106. The pin 112 extends through a quadrilateral shaped slot 116 of the sleeve-like extension 99, the slot shape being best shown in Figure 2.

The sleeve 110 has a peripheral groove 118 in which a pair of shoes 120 are slidably located. Each shoe 120 is pivoted at 122 to an arm 124 of a rock-shaft 126. Only one set of arms and shoes is shown in Figure 1, it being obvious there would be a set for each side of the sleeve 110. The shaft 126 extends to any desirable point for manually or automatically controlling the apparatus as will hereinafter appear.

For reversing purposes, we provide the following described mechanism within the housing 18. A sprocket 128 is formed on the driven shaft 54 and is chained by a chain 130 to an idler sprocket 132. The idler sprocket 132 is mounted on an idler shaft 134 journaled in bearings 136 and 138. A reverse gear 140 meshes with a second reverse gear 142, the gear 142 being splined on the extension 26 of the propeller shaft 20.

The sprocket 128 and the gear 142 are provided with clutch lugs 144 and 146 respectively adapted to mesh with each other, when the gear 142 is shifted out of mesh with the gear 140 and from the position shown in Figure 1. There is then a direct drive from the driven shaft 54 to the propeller shaft 20 which of course is "normal" operation. When it is desirable to drive the automobile in reverse, the adjustment shown in Figure 1 is made.

For effecting such adjustment a manually controlled rock-shaft 148 is provided having a pair of arms 150 to each of which a shoe 152 is pivoted. The shoes engage the periphery of the gear 142 for shifting the gear out of mesh with the gear 140 and into engagement with the sprocket 128 at the clutch lugs 144 and 146.

In a hydraulic drive of the character disclosed it is desirable to eliminate air pockets from the oil chamber 62. We accordingly keep the oil therein under slight pressure as by means of a pump 154 driven in any suitable manner such as from the idler shaft 134. This pump may be of the ordinary type having a pair of gear-like rotors with an intake 156 and an outlet 158. In Figure 1 the near side gear has been omitted.

An oil pipe 160 supplies oil from a sump or pan 162 to the intake 156, the oil being carried at about the level shown by the dot and dash line 164. The oil itself has been omitted for clarity in the drawings. The sump 162 may be provided with a drain plug 166 if desired.

The pump outlet 158 is connected as by passageways 168 with an annular groove 170 surrounding the propeller shaft 20. The oil may flow from this groove through a cross opening 172 into a central bore 174 of the shaft and its extension 26, then through a similar bore 176 in the driven shaft 54. The oil discharges from the left hand end of the driven shaft 54 into the oil chamber 62, although some of it finds its way to the various working parts as by cross-passageways 178 to the sleeve 108. Any oil that exudes from the left end of the sleeve 108 enters the gear housing 42 for oiling the bearings and gears therein. Many of the working parts are thus well lubricated whereas others such as the crank pins and the connecting rods are lubricated by dipping into the sump 162.

*Practical operation*

In the operation of our hydraulic clutch and variable speed drive, the engine connected to the power shaft 10 may be idling and the brake of the automobile will hold the vehicle from moving. The gear 52 is thereby held against rotation so that rotation of the housings 28 and 42 carries the gears 50 around with them and they thereby rotate for reciprocating the pistons 34 in the cylinders 32. Since the valves 68 are wide open, oil from the oil chamber 62 freely passes through the ports 74 of the valves 68 on the intake and the discharge strokes out of and into the oil chamber without offering appreciable resistance to the pumping action. Accordingly there is no transmission of power except a slight tendency for the driven shaft 54 to be rotated due to the friction of the oil against the sides of the passageways through which it travels.

When the brake is released, ordinarily there is enough friction to prevent movement of the vehicle when standing on a level surface without speed-up of the engine. To then effect movement of the vehicle, the engine is speeded up which causes centrifugal force to start moving the valves 68 outwardly. The springs 72 keep them at their inner limits of movement as long as only idling speed is attained. The valves will however move outwardly in proportion to the amount of speed-up and therefore the faster the engine is speeded up the further the valves are moved toward closed position. Closing or partially closing the valves in this manner introduces resistance to the flow of oil so that resistance is in turn offered to the reciprocations of the pistons 34. Accordingly the turning effect on the gear 52 increases and the increase is in proportion to the speed to which the engine is advanced.

Therefore, the vehicle will start moving and there will be a flexible transmission of power to it with an effective gradual increase in gear ratio until such time as the vehicle has attained a speed corresponding to the speed of the engine. When the valves 68 under the action of centrifugal force assume their outermost positions, the ports 74 are completely closed and there is then had a direct drive from the power shaft 10 to the propeller shaft 20. The pistons at that time are hydraulically locked against movement and the gears 50 no longer rotate relative to the gear 52. The entire assembly of elements 28 to 50 as well as the valves 68, rock-arms 92, rock-shafts 94, pinions 96 and gear 98 then rotates as a unit. At all times such unit serves as a fly wheel regardless of whether it is locked in direct drive or is idling with no driving force transmitted.

When the parts are in the position just described for "direct drive," if there is any oil loss from the cylinders past the pistons therein, the loss from any one cylinder occurs while the piston is slowly moving into the cylinder. When the piston reverses (moves outwardly in the cylinder) it is desirable to replace the oil loss with oil from the oil chamber 52. This is accomplished through the check valve 82 which opens due to the suction produced by the piston when traveling outwardly.

When it is desirable to reverse the direction of travel of the vehicle the gear 142 can be shifted in a manner already described. Manual or automatic control is also had of the valves 68 by means of the rock-shaft 126 operating the pin 112. The pin is normally in the position of Figure 2 so that centrifugal force is free to act on the valves 68 throughout their entire ranges of movement. Movement of the pin 112 to the dotted position indicated at 112ª results in the sleeves 99 and 106 being locked against relative movement with the valves 68 in open position. Accordingly centrifugal force cannot move the valves outwardly and the engine can be speeded up without transmitting power to the driven shaft 54 except what little might be imparted thereto due to increased friction of the oil in its passageways at the higher speed with which it is being pumped.

Another adjustment may be had as shown by dot and dash lines 112ᵇ and this would lock the valves 68 in open position after speed had been attained. The drive is then locked in "high" as the springs 72 are restrained from expanding when centrifugal force acting on the valves decreases.

Still another adjustment position is the pin intermediate 112 and 112ª in Figure 2 and this limits the closing movement of the valves as the lower inclined part of the slot 116 is closer to the base of the triangle at these points. Therefore the driver in effect can have a lower speed ratio as the gears 50 are not entirely locked against rotation, but are permitted some rotation. Accordingly, the fly wheel can rotate faster than the gear 52 and the ratio of one to the other can be changed by positioning the pin at different points intermediate the positions 112 and 112ª in Figures 2 and 3. Likewise, positions of the pin 112 intermediate 112 and 112ᵇ in Figure 2 vary the limit of valve movement between fully closed and full range.

It is obvious from the foregoing specification that we have provided a hydraulic clutch and variable speed drive which is normally automatic in operation, and which may be selectively adjusted for effecting either a locked-in direct drive when the pin is in the position 112ᵇ or a higher gear ratio than usual for emergencies. By utilizing the weight of the valves and the synchronization mechanism therefor in such a manner that centrifugal force tends to throw the valves outwardly we provide a governing action which operates relatively smoothly and particularly so due to the valves being of balanced character. The valve ports 74 are made triangular shaped so that their initial movement outwardly permits greater oil flow per unit of movement than when they approach their outward limits of movement. The cut-off of oil is therefore tapered off giving finer adjustment at high speed than at low speed—a desirable operating characteristic in a drive of this character.

Some changes may be made in the construction and arrangement of the parts of our device without departing from the real spirit and purpose of our invention, and it is our invention to cover by our claims any modified forms of structure or use of mechanical equivalents which may be reasonably included within their scope without sacrificing any of the advantages thereof.

We claim as our invention:

1. In a hydraulic clutch and variable speed drive, a power shaft, a flywheel assembly driven thereby and comprising cylinders, pistons therein, connecting rods, crank shafts and crank shaft gears rotatable as a unit, said cylinders being distributed around the axis of rotation of said power shaft, said connecting rods connecting said pistons with said crank shafts, a driven shaft having a gear meshing with said crank shaft gears, an oil chamber, balanced valve means interposed between said cylinders and said oil chamber for controlling the flow of oil pumped by said pistons to and from the oil chamber, said valve means comprising a plurality of radially slidable valves distributed around said axis of rotation and closable by centrifugal force, and means for synchronizing the movement of said valves.

2. A hydraulic clutch and variable speed drive comprising a power shaft, a fly wheel assembly driven thereby and comprising cylinders, pistons therein connecting rods, crank shafts, crank shaft gears, an oil chamber, valves located between said cylinder and said oil chamber for controlling the flow of oil pumped by said pistons to and from the oil chamber, and synchronizing means for said valves, the foregoing elements being rotatable as a unit, said cylinders, pistons and valves being distributed around the axis of rotation of said power shaft, said connecting rods connecting said pistons with said crank shafts, and a driven shaft having a gear meshing with said crank shaft gears, said valves being radially slidable, closable as they move outwardly and being so moved by centrifugal force.

3. In a hydraulic clutch and variable speed drive, a power shaft, oil pumping means driven thereby and comprising cylinders, pistons therein, connecting rods, crank shafts and crank shaft gears rotatable as a unit, said cylinders being distributed around the axis of rotation of said power shaft, said connecting rods connecting said pistons with said crank shafts, a driven shaft having a gear meshing with said crank shaft gears, an oil chamber, a check valve between said oil chamber and each of said cylinders and valve means for controlling the flow of oil pumped by said pistons to and from said oil chamber, said valve means comprising a plurality of valves arranged to slide radially and distributed around said axis of rotation and closable by centrifugal force acting directly on the valves.

4. In a hydraulic clutch and variable speed drive, a power shaft, oil pumping means driven thereby, and comprising cylinders, pistons therein, connecting rods, crank shafts and crank shaft gears rotatable as a unit, said cylinders being distributed around the axis of rotation of said power shaft, said connecting rods connecting said pistons with said crank shafts, a driven shaft having a gear meshing with said crank shaft gears, an oil chamber, valves for controlling the flow of oil pumped by said pistons to and from said oil chamber, said valves being movable by centrifugal force acting directly thereon to decrease the oil flow with an increase of speed of said fly wheel assembly for automatically governed control of said driven shaft from said power shaft, said valves having tapered ports to permit greater oil flow per unit of movement at their radial inner ends of their travel than at their radial outer ends thereof.

5. In a hydraulic clutch and variable speed drive, a power shaft, a fly wheel assembly driven thereby, and comprising oil pumping means and control valves for the pumped oil, a driven shaft rotated by said power shaft when said valves are partially or fully closed, said valves being hydraulically balanced, radially slidable and movable by centrifugal force acting directly thereon to decrease the oil flow with an increase of speed of said fly wheel assembly for automatically controlling the speed of said driven shaft from said power shaft, and selective control means for reducing or preventing the throw of said valves due to said centrifugal force acting thereon, said selective control means comprising levers directly engaging said valves for positively keeping them open or for positively closing them.

6. In a drive of the character described, a power shaft, a fly wheel assembly driven thereby, and comprising cylinders, pistons therein, connecting rods, crank shafts and crank shaft gears rotatable as a unit, said cylinders being distributed around the axis of rotation of said power shaft, said connecting rods connecting said pistons with said crank shafts, a driven shaft having a gear meshing with said crank shaft gears, balanced valves for controlling the flow of oil pumped by said pistons, said balanced valves being radially movable by centrifugal force acting directly on the valves to decrease the oil flow with an increase of speed of said fly wheel assembly, and selective control means for reducing or preventing the throw of said balanced valves due to centrifugal force acting on the valves.

7. In a drive of the character described, a power shaft, a fly wheel assembly driven thereby and including pumping means, a driven shaft geared to said pumping means, valves for controlling the flow of oil pumped by said pumping means, said valves being movable by centrifugal force to decrease the oil flow with an increase of speed of said fly wheel assembly, selective control means for reducing the throw of said valves due to centrifugal force, synchronizing means for said valves, said selective control means comprising an element of said synchronizing means and an element carried by said driven shaft having slots, and a pin in said slots permitting free relative movement of said elements when in one position and preventing such relative movement when in another position, with intermediate positions of the pin variably limiting the relative movement.

8. In a drive of the character described, a power shaft, a fly wheel assembly driven thereby and including pumping means, a driven shaft geared to said pumping means, valves for controlling the flow of oil pumped by said pumping means, springs tending to open said valves, said valves being movable radially by centrifugal force acting on the valves to slide them against the bias of said springs and thereby decrease the oil flow with an increase of speed of said fly wheel assembly for automatically governed control of said driven shaft from said power shaft, said valves having substantially triangular shaped ports to permit greater oil flow per unit of movement at the inner ends of their travel than at the outer ends thereof, and selective control means for reducing or preventing the throw of said valves due to said centrifugal force acting thereon said selective control means comprising synchronized levers directly engaging said valves for positively keeping them open, positively closing them, or limiting their closing or opening movement.

9. In a hydraulic clutch and variable speed drive, a power shaft, a fly wheel assembly driven thereby, and comprising oil pumping means, valves for controlling the flow of oil pumped by said pumping means, said valves being movable by centrifugal force to decrease the oil flow with an increase of speed of said fly wheel assembly, synchronizing means for said valves comprising rock shafts, rock arms attached thereto and coacting with said valves, pinions on said rockshafts and a gear rotatable about the axis of said driven shaft and meshing with said pinions, and selective means for locking said gear against rotation relative to said fly wheel assembly, said rockshafts, rock arms and pinions being rotatable with and forming a part of said fly wheel assembly.

10. In a hydraulic clutch and variable speed drive, a power shaft, a fly wheel assembly driven thereby, and comprising cylinders, pistons therein, connecting rods, crank shafts, crank shaft gears, control valves and synchronizing means therefor rotatable as a unit, said valves being movable by centrifugal force to decrease the oil flow with an increase of speed of said fly wheel assembly, selective control means for reducing or preventing the throw of said valves due to centrifugal force, said selective control means comprising an element of said synchronizing means and a second element carried by said driven shaft having slots, a pin in said slots permitting free relative movement of said synchronizing means relative to said element when in one position and preventing such relative movement when in another position, with intermediate positions of the pin variably limiting the relative movement, and means to move said pin to its different adjusted positions.

11. In a hydraulic clutch and variable speed drive, a power shaft, a fly wheel assembly driven thereby and comprising cylinders, pistons therein, connecting rods, crank shafts and crank shaft gears rotatable as a unit, bearings for said crankshaft gears, said cylinders being distributed around the axis of rotation of said power shaft, said connecting rods connecting said pistons with said crank shafts, a driven shaft having a gear meshing with said crank shaft gears, valves for controlling the flow of oil pumped by said pistons, a reservoir, an oil chamber communicating with said cylinders through said valves and having on outlet through said crankshaft gears and said bearings, and pump means for pumping oil from said reservoir, supplying it to and maintaining it under pressure in said oil chamber and causing it to flow through said crankshaft gears and said bearings.

12. In a hydraulic drive of the character disclosed, a power shaft, a fly wheel assembly driven thereby, and comprising pump means including pump gears and bearings a driven shaft having a gear meshing with said pump gears, valves for controlling the flow of pumped oil, a reservoir, an oil chamber communicating with said pump means through said valves, said pump means pumping oil to and from said oil chamber, and additional pump means for pumping oil from said reservoir, supplying and maintaining it under pressure in said oil chamber and for oiling said gears and bearings with the oil leaving said oil chamber.

13. In a hydraulic clutch and variable speed drive, a power shaft, a fly wheel assembly driven thereby, and comprising cylinders, pistons therein, connecting rods, crank shafts, crank shaft gears, bearings for said crankshafts, balanced valves for controlling the flow of oil pumped by said pistons, and synchronizing means for said valves, all rotatable as a unit, said connecting rods connecting said pistons with said crank shafts, a driven shaft having a gear meshing with said crank shaft gears, a reservoir, an oil chamber communicating with said cylinders, said valves being located between said cylinders and said oil chamber, and pump means for pumping oil from said reservoir and supplying it under pressure to said oil chamber, said oil chamber having a return to said reservoir through said gears and bearings.

14. In a hydraulic clutch and variable speed drive, a power shaft, a pump assembly driven thereby and including pumping means and gears, a driven shaft having a gear meshing with said first gears, valves for controlling the flow of pumped oil and thereby the braking effect of said pumping means on said first gears, said valves being radially movable by centrifugal force acting directly thereon to decrease the oil flow with an increase of speed of said pump assembly for automatically governed control of said driven shaft from said power shaft, and selective means to limit the radial throw of said valves as caused by centrifugal force to effect a reduced speed ratio of said driven shaft relative to said power shaft.

15. In a hydraulic clutch and variable speed drive, a power shaft, a pump assembly driven thereby and including pumping means and gears, a driven shaft having a gear meshing with said first gears, valves for controlling the flow of pumped oil and thereby the braking effect of said pumping means on said first gears, said valves being movable by centrifugal force to decrease the oil flow with an increase of speed of said pump assembly for automatically governed control of said driven shaft from said power shaft, selective means to limit the throw of said valves to effect a reduced speed ratio of said driven shaft relative to said power shaft, a reservoir, an oil chamber communicating with said pumping means, and additional pump means for pumping oil from said reservoir and supplying it to and maintaining it under pressure in said oil chamber.

16. In a hydraulic clutch and variable speed drive, a power shaft, a driven shaft, a fly wheel assembly driven by said power shaft and comprising oil pumping means, a gear housing rotatable on said driven shaft, geared connection between said drive shaft and said oil pumping means including intermediate shafts journaled in said gear housing, valves for controlling the flow of oil pumped by said pumping means, means for synchronizing said valves comprising rock shafts journaled in said gear housing, a rock arm attached to one end of each rock shaft and coacting with said valves at one end of said gear housing, pinions on the other ends of said rock shafts at the other end of said gear housing, and a gear rotatable about the axis of said driven shaft and meshing with said pinions.

17. In a hydraulic clutch and variable speed drive, a power shaft, pumping means driven thereby and including cylinders, pistons therein, connecting rods, crank shafts and gears, a driven shaft operatively connected with said pistons by means of said connecting rods, crank shafts and gears, an oil chamber, balanced valve means interposed between said cylinders and said oil chamber for controlling the flow of oil pumped by said pistons to and from the oil chamber, said valve means comprising a plurality of radial slidably tubular valves distributed around the axis of rotation and closed by centrifugal force, each of said tubular valves having a plurality of intake ports equally distributed around its periphery for receiving oil from said cylinders and having an outlet to said oil chamber from the interior of the tubular valve.

CECIL HARVEY MYERS.
HUBERT A. MYERS.

REFERENCES CITED

The following references are of record in the file of this patent:

UNITED STATES PATENTS

| Number | Name | Date |
|---|---|---|
| 833,772 | Cheyne | Oct. 23, 1906 |
| 1,274,462 | Shepard | Aug. 6, 1918 |
| 1,380,619 | Wheeler | June 7, 1921 |
| 1,754,953 | Igou | Apr. 15, 1930 |
| 1,861,909 | Curtis | June 7, 1932 |
| 1,908,378 | Tiberio | May 9, 1933 |
| 2,025,472 | Perry | Dec. 24, 1935 |
| 2,106,307 | Smith | Jan. 25, 1938 |

FOREIGN PATENTS

| Number | Country | Date |
|---|---|---|
| 419,802 | France | Jan. 16, 1911 |
| 590,274 | France | June 13, 1925 |